United States Patent
Hirowatari

(10) Patent No.: US 9,930,762 B2
(45) Date of Patent: Mar. 27, 2018

(54) LIGHTING CONTROL DEVICE, LIGHTING SYSTEM, AND CONTROL METHOD

(71) Applicant: Panasonic Intellectual Property Management Co., Ltd., Osaka (JP)

(72) Inventor: Yuichirou Hirowatari, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/602,734

(22) Filed: May 23, 2017

(65) Prior Publication Data

US 2017/0347436 A1    Nov. 30, 2017

(30) Foreign Application Priority Data

May 26, 2016    (JP) .................................. 2016-105675

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |

(52) U.S. Cl.
CPC ................ *H05B 37/0281* (2013.01)

(58) Field of Classification Search
None
See application file for complete search history.

(56) References Cited

U.S. PATENT DOCUMENTS

| | | | |
|---|---|---|---|
| 2010/0301768 A1* | 12/2010 | Chemel | H05B 37/029 315/294 |
| 2012/0299512 A1 | 11/2012 | Watanabe et al. | |
| 2013/0033183 A1* | 2/2013 | Verfuerth | H05B 37/0272 315/154 |
| 2014/0015418 A1* | 1/2014 | Pandharipande | H05B 37/0218 315/152 |

FOREIGN PATENT DOCUMENTS

| | | |
|---|---|---|
| JP | 2007-035420 A | 2/2007 |
| JP | 2012-204027 A | 10/2012 |
| JP | 2012-243688 A | 12/2012 |
| JP | 2015-079600 A | 4/2015 |

* cited by examiner

*Primary Examiner* — Anh Tran
(74) *Attorney, Agent, or Firm* — McDermott Will & Emery LLP

(57) ABSTRACT

A controller included in a lighting control device causes a transmitter to transmit a dimming rate which is determined by schedule information stored in a storage when power saving is not instructed via a power saving instruction signal. When power saving is instructed via the power saving instruction signal, the controller calculates a dimming rate for causing a luminaire to emit light at a brightness lower than in the case of the dimming rate determined by the schedule information. When the calculated dimming rate is a dimming rate which causes the luminaire to emit light at a brightness lower than a predetermined dimming rate, the controller causes the transmitter to transmit the predetermined dimming rate.

11 Claims, 9 Drawing Sheets

LIGHTING CONTROL DEVICE, LIGHTING SYSTEM, AND CONTROL METHOD

CROSS REFERENCE TO RELATED APPLICATION

This application claims the benefit of priority of Japanese Patent Application Number 2016-105675 filed on May 26, 2016, the entire content of which is hereby incorporated by reference.

BACKGROUND

1. Technical Field

The present disclosure relates to a lighting control device etc. having a scheduling function.

2. Description of the Related Art

Conventionally, control systems for lighting devices having a scheduling function that is a function for changing brightness of luminaires as time elapses (for example, see Patent Literature 1 (PTL 1: Japanese Unexamined Patent Application Publication No. 2015-079600).

SUMMARY

When the lighting devices in such a control system for lighting devices as mentioned above are caused to emit light at a brightness lower than usual in order to reduce the amount of power to be used, if the light is emitted by a luminaire at a too low brightness, one cannot see a surrounding environment enough and is exposed to a danger.

The present disclosure relates to a lighting control device, a lighting system, and a control method for securing safety and reducing the amount of power to be used.

A lighting control device according to an aspect of the present disclosure is a lighting control device which controls a luminaire that emits light at a brightness that varies in accordance with a control value which has been received, the lighting control device including: a storage which stores schedule information in which a control value and one of a time point or a time period are associated with each other; a transmitter which transmits a control value to the luminaire; an obtainer which obtains a power saving instruction signal for instructing the lighting control device to save power or not; and a controller, wherein the controller: when power saving is not instructed via the power saving instruction signal, causes the transmitter to transmit the control value which is determined by the schedule information stored in the storage; and when power saving is instructed via the power saving instruction signal, calculates a control value for causing the luminaire to emit light at a brightness lower than in the case of the control value determined by the schedule information, and, when the control value calculated is a control value which causes the luminaire to emit light at a brightness lower than in the case of a predetermined control value, causes the transmitter to transmit the predetermined control value.

A lighting control device according to an aspect of the present disclosure is a lighting control device which controls a luminaire that emits light at a brightness that varies in accordance with a control value which has been received, the lighting control device including: a storage which stores schedule information in which a control value and one of a time point or a time period are associated with each other; a transmitter which transmits a control value to the luminaire; an obtainer which obtains a power saving instruction signal for instructing the lighting control device to save power or not; and a controller, wherein the controller: when power saving is instructed via the power saving instruction signal, determines whether or not a current time falls within a predetermined time period; when determining that the current time falls within the predetermined time period, causes the transmitter to transmit the control value which is determined by the schedule information stored in the storage; and when determining that the current time does not fall within the predetermined time period, calculates a control value for causing the luminaire to emit light at a brightness lower than in the case of the control value determined by the schedule information, and causes the transmitter to transmit the control value calculated.

A lighting system according to an aspect of the present disclosure includes: a luminaire that emits light at a brightness that varies in accordance with a control value which has been received; and a lighting control device which controls the luminaire; wherein the lighting control device includes: a storage which stores schedule information in which a control value and one of a time point or a time period are associated with each other; a transmitter which transmits a control value to the luminaire; an obtainer which obtains a power saving instruction signal for instructing the lighting control device to save power or not; and a controller, wherein the controller: when power saving is not instructed via the power saving instruction signal, causes the transmitter to transmit the control value which is determined by the schedule information stored in the storage; and when power saving is instructed via the power saving instruction signal, calculates a control value for causing the luminaire to emit light at a brightness lower than in the case of the control value determined by the schedule information, and, when the control value calculated is a control value which causes the luminaire to emit light at a brightness lower than in the case of a predetermined control value, causes the transmitter to transmit the predetermined control value.

A lighting system according to an aspect of the present disclosure includes: a luminaire that emits light at a brightness that varies in accordance with a control value which has been received; and a lighting control device which controls the luminaire; wherein the lighting control device includes: a storage which stores schedule information in which a control value and one of a time point or a time period are associated with each other; a transmitter which transmits a control value to the luminaire; an obtainer which obtains a power saving instruction signal for instructing the lighting control device to save power or not; and a controller, wherein the controller: when power saving is instructed via the power saving instruction signal, determines whether or not a current time falls within a predetermined time period; when determining that the current time falls within the predetermined time period, causes the transmitter to transmit the control value which is determined by the schedule information stored in the storage; and when determining that the current time does not fall within the predetermined time period, calculates a control value for causing the luminaire to emit light at a brightness lower than in the case of the control value determined by the schedule information, and causes the transmitter to transmit the control value calculated.

A control method according to an aspect of the present disclosure is a method for controlling a luminaire which emits light at a brightness that varies in accordance with a control value which has been received, the control method including: obtaining a power saving instruction signal; when power saving is not instructed via the power saving instruction signal, transmitting, to the luminaire, a control value which is determined by schedule information in which the control value and one of a time point or a time period are associated with each other; and when power saving is instructed via the power saving instruction signal, calculating a control value for causing the luminaire to emit light at a brightness lower than in the case of the control value determined by the schedule information, and, when the control value calculated is a control value which causes the luminaire to emit light at a brightness lower than in the case of a predetermined control value, transmitting the predetermined control value to the luminaire.

A control method according to an aspect of the present disclosure is a method for controlling a luminaire that emits light at a brightness that varies in accordance with a control value which has been received, the lighting control device including: obtaining a power saving instruction signal; when power saving is instructed via the power saving instruction signal, determining whether or not a current time falls within a predetermined time period; when determining that the current time falls within the predetermined time period, transmitting, to the luminaire, a control value which is determined by schedule information in which the control value and one of a time point or a time period are associated with each other; and when determining that the current time does not fall within the predetermined time period, calculating a control value for causing the luminaire to emit light at a brightness lower than in the case of the control value determined by the schedule information, and transmitting the control value calculated to the luminaire.

The lighting control device, the lighting system, and the control method according to the present disclosure make it possible to secure safety and reduce the amount of power to be used.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, an embodiment is described with reference to the drawings. It is to be noted that the embodiment described below shows a general example. The numerical values, shapes, materials, constituent elements, the arrangement and connection of the constituent elements, steps, the processing order of the steps etc. shown in the following exemplary embodiment are mere examples, and therefore do not limit the scope of the present disclosure. In addition, among the constituent elements in the following exemplary embodiment, constituent elements not recited in any one of the independent claims that define the most generic concept are described as arbitrary constituent elements.

It is to be noted that each of the drawings is a schematic diagram, and is not always illustrated precisely. In addition, in each of the diagram, substantially the same constituent elements are assigned with the same numerical references, and overlapping descriptions may be omitted or simplified.

Embodiment

[Configuration of a Lighting System]

Figure 1:
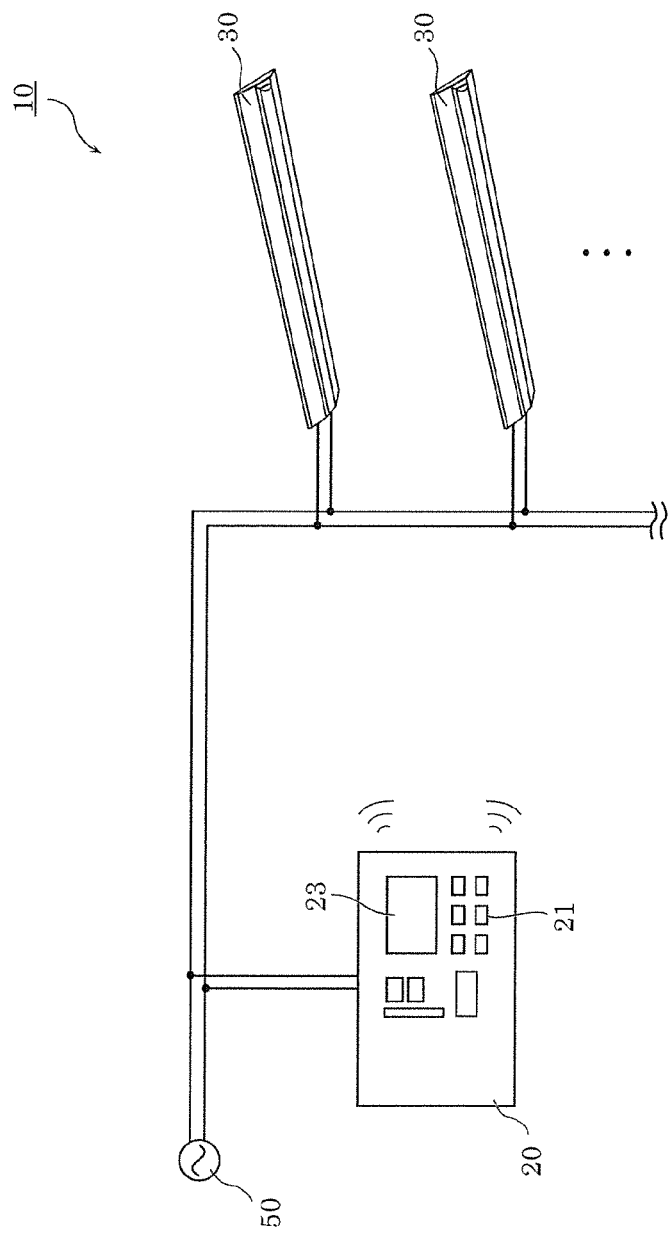
FIG. 1 is a schematic diagram of a lighting system according to an embodiment.
Figure 2:
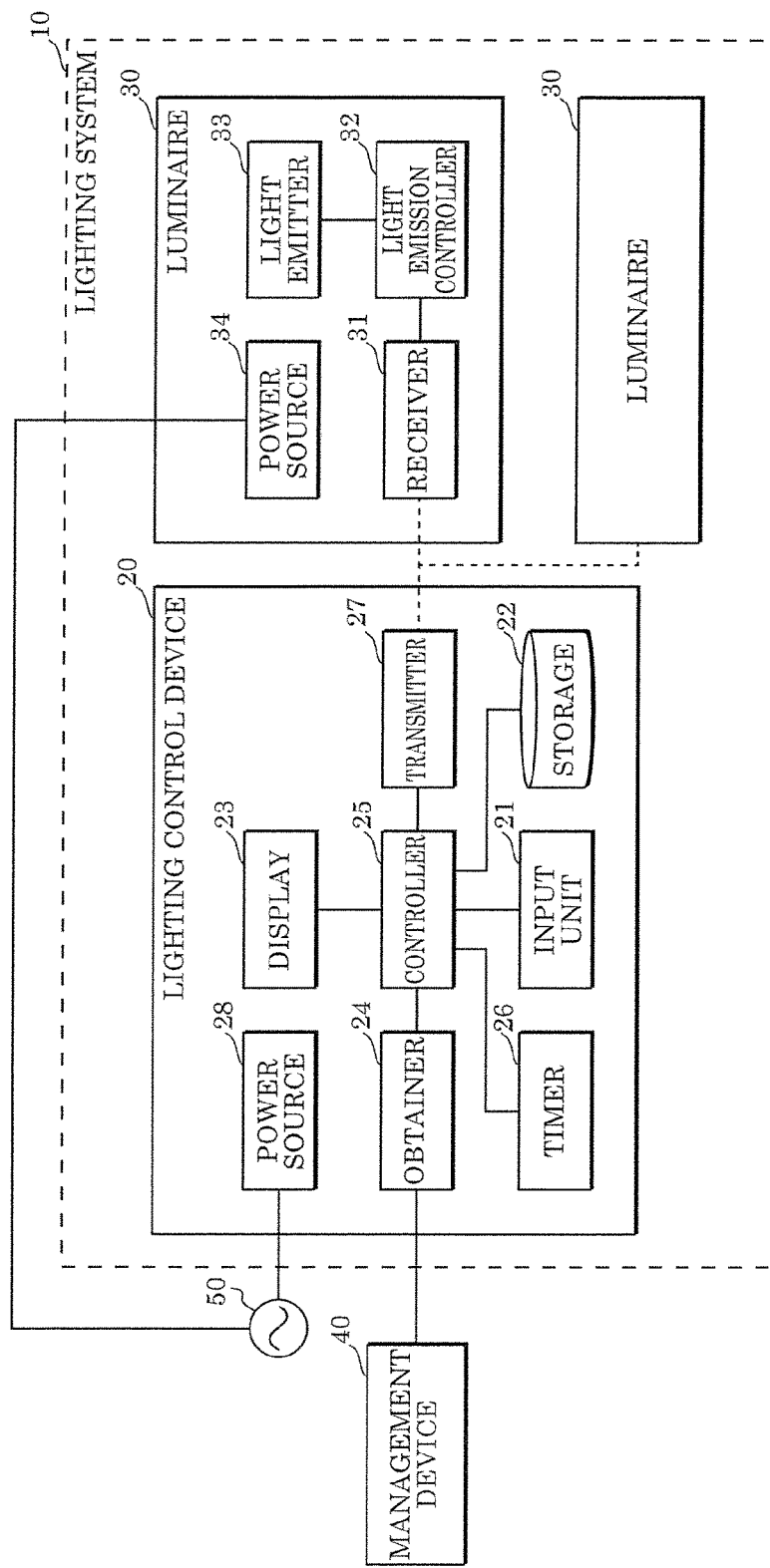
FIG. 2 is a block diagram illustrating a functional configuration of the lighting system according to the embodiment.

First, a configuration of a lighting system according to an embodiment is described. FIG. 1 is a schematic diagram of the lighting system according to the embodiment. FIG. 2 is a block diagram illustrating a functional configuration of the lighting system according to the embodiment.

As illustrated in FIGS. 1 and 2, lighting system 10 according to the embodiment includes lighting control device 20 and a plurality of luminaires 30. In addition, FIGS. 1 and 2 illustrate management device 40 (illustrated in FIG. 2) and power system 50. It is to be noted that management device 40 may be included in lighting system 10.

Lighting system 10 is a system for allowing a user to collectively control at least one luminaire 30 via lighting control device 20. Lighting system 10 has a schedule function for changing brightness of luminaire 30 as time elapses.

In addition, in lighting system 10, lighting system 10 is also capable of causing luminaire 30 to emit light at a lower brightness in accordance with a demand signal, and thereby reduces the amount of power to be used in the building in which lighting system 10 is provided. It is to be noted that the demand signal is a signal which is, for example when the amount of power to be used is predicted to exceed a target use amount, for notifying lighting system 10 of the fact, and is output by management device 40. Management device 40 outputs the demand signal, based on one of (i) the total of the amounts of power used in the building and measured by management device 40 or (ii) the total of the amounts of power used in the building obtained from another device such as a power measuring device. Management device 40 is, specifically, a server or the like.

In lighting system 10, control for preventing luminaire 30 from emitting light at a brightness below a predetermined brightness even when power saving has been instructed via the demand signal. In this way, lighting system 10 is capable of reducing the amount of power to be used while securing safety. Hereinafter, each of constituent elements of lighting system 10 is described.

[Lighting Control Device]

Lighting control device 20 is a device for controlling luminaire 30 by transmitting a dimming rate to luminaire 30. The dimming rate (dimming ratio) is an example of a control value. For example, a dimming rate for causing luminaire 30 to be in a fully turned on state is 100% (i.e., not dimmed so as to output light at 100%), and a dimming rate for causing luminaire 30 to be in a turned off state is 0%.

Lighting control device 20 is a device separate from luminaire 30, and thus lighting control device 20 itself does not have a lighting function. Lighting control device 20 includes: input unit 21, storage 22, display 23, obtainer 24, controller 25, timer 26, transmitter 27, and power source 28.

Input unit 21 is a user interface which receives an input from a user. The user inputs a brightness of luminaire 30 and one of a time point or a time period via input unit 21. In other words, the user inputs a schedule of luminaire 30 via input unit 21. In this way, the schedule information in which either the input time point or time period and a dimming rate for causing luminaire 30 to emit light having the input brightness is stored by controller 25 onto storage 22.

In addition, when power saving is instructed via the demand signal, the user can also input a reduction rate [%] indicating to what degree the dimming rate determined by the schedule information is reduced. When power saving is instructed via the demand signal, luminaire 30 emits light at an integrated dimming rate obtained by integrating (100%− the reduction rate) to the dimming rate before the integration. It is to be noted that the user may input a reduction amount instead of the reduction rate. In this case, when power saving is instructed via the demand signal, luminaire 30 emits light at a dimming rate obtained by subtracting the reduction amount from the dimming rate before the subtraction.

In addition, even when power saving is instructed via the demand signal, the user can also input a predetermined brightness (a predetermined dimming rate) which is the minimum brightness that the user desired to secure. The dimming rate is not particularly limited, and for example, 20%.

In addition, the user can also input a predetermined time period. In operation example 2 to be described later, the predetermined time period is a time period in which the minimum brightness (dimming rate) of luminaire 30 is determined. In operation example 3 to be described later, the predetermined time period is a time period in which the power saving instruction by the demand signal is invalidated.

Input unit 21 is, for example, a hardware switch (hardware button) that is for example a dual in-line package (DIP) switch, a rotary switch, a ten key switch, or the like, or a touch panel or the like.

Storage 22 stores schedule information in which a dimming rate and one of the time point or time period are associated with each other. Storage 22 also stores the reduction rate, the predetermined dimming rate, and the predetermined time period input by the user. In addition, storage 22 also stores a control program which is executed by controller 25.

Storage 22 is for example a storage device such as a semiconductor memory. Information is stored by controller 25 onto storage 22. It is to be noted that storage 22 may be embedded in controller 25.

Display 23 displays characters, numerical values, or symbols for helping the user to input a schedule under control of controller 25. Display 23 may display an image that is for example a still image or a video. Display 23 includes, for example, a display panel formed by either a liquid crystal display (LCD), an organic electro luminescence (EL) panel or the like and a driver circuit thereof.

Obtainer 24 obtains the demand signal for instructing lighting control device 20 to save power or not. Obtainer 24 is for example a communication module (communication circuit), and obtains the demand signal from management device 40 via wired communication. It is to be noted that obtainer 24 may obtain the demand signal from management device 40 via wireless communication.

The demand signal is a binary electric signal (digital signal) which changes to a high level in the case where the amount of power to be used in the building is predicted to exceed the target use amount, and changes to a low level in the other cases. It is to be noted that the logic of the demand signals may be inversed. In addition, the demand signal may be of any other type. The demand signal may be, for example, a timing signal which is transmitted at each of a timing at which power saving is started and a timing at which the power saving is finished.

Controller 25 is a control device which performs various kinds of control of lighting control device 20. Controller 25 generates schedule information based on the schedule received by input unit 21, and stores the generated schedule information onto storage 22. Controller 25 stores, onto storage 22, the information such as the reduction rate, the predetermined dimming rate, the predetermined time period, etc. In addition, controller 25 causes display 23 to display the characters, the numerical values, the symbols, or the image to help the user to input the schedule.

In addition, for example, controller 25 reads out the schedule information stored in storage 22, and identifies the dimming rate corresponding to a current time notified by timer 26. Subsequently, controller 25 causes transmitter 27 to transmit a control signal including the identified dimming rate. In other words, controller 25 causes transmitter 27 to transmit the dimming rate. The control signal transmitted by transmitter 27 is received by receiver 31 included in luminaire 30.

In addition, controller 25 calculates a dimming rate (hereinafter, also referred to as a dimming rate for power saving) in the case where power saving is instructed via the demand signal. For example, controller 25 calculates the dimming rate obtainable by integrating (100%−the reduction rate) to the dimming rate before the integration, as the dimming rate for power saving.

Controller 25 is for example a microcomputer, and may be implemented using a processor, an exclusive circuit, or the like.

Timer 26 measures a current time, and notifies controller 25 of the current time. Timer 26 is for example a general-purpose timer IC (timer circuit), a real-time clock IC, or the like. It is to be noted that timer 26 may be embedded in controller 25. In this case, timer 26 is for example an on-chip oscillator. When timer 26 is the on-chip oscillator, by means of a crystal oscillator being attached externally, it is possible to increase the accuracy in measuring current time.

Transmitter 27 transmits the control signal including the dimming rate to luminaire 30. In other words, transmitter 27 transmits the dimming rate. Transmitter 27 is for example a communication circuit (communication module), and transmits the control signal to receiver 31 included in luminaire 30 via wireless communication. The scheme of wireless communication is not particularly limited, and for example specified low power radio using a frequency band of 720 MHz. It is to be noted that transmitter 27 may transmit the control signal via wired communication.

Power source 28 converts alternating power supplied from power system 50 to direct power suitable for operation by lighting control device 20, and supplies lighting control device 20 with the direct power. Power source 28 is for example a power circuit including an AC/DC converter or a DC/DC converter, etc.

[Luminaire]

Next, luminaire 30 is described. Luminaire 30 is what is called a ceiling light which illuminates inside of a room, and emits light at a brightness that varies in accordance with the dimming rate received from lighting control device 20. In short, luminaire 30 is subjected to dimming control by lighting control device 20. It is to be noted that the shape of luminaire 30 is not limited to an elongated shape as illustrated in FIG. 1. Luminaire 30 may be a ceiling light having a circular shape when seen in plan view, a downlight, or the like. Although lighting system 10 in this embodiment includes a plurality of luminaires 30, it is only necessary for a lighting system according to the present disclosure to include at least one luminaire 30. Luminaire 30 includes receiver 31, light emission controller 32, light emitter 33, and power source 34.

Receiver 31 receives the control signal including the dimming rate from lighting control device 20. In short, receiver 31 obtains the dimming rate. Receiver 31 is for example a communication circuit (communication module), and receives the dimming rate from transmitter 27 included in lighting control device 20 via wireless communication. It is to be noted that receiver 31 may receive the dimming rate via wired communication.

Light emission controller 32 supplies light emitter 33 with voltage and current suitable for the dimming rate received by receiver 31. Light emission controller 32 includes for example a pulse width modulation (PWM) controller circuit. In addition, light emission controller 32 includes a microcomputer, a processor, or an exclusive circuit each for controlling the PWM controller circuit.

Light emitter 33 is a light emitting module which emits light using voltage and current which is supplied from light emission controller 32. Light emitter 33 includes for example a light emitting diode (LED) as a light emitting element. Light emitter 33 may include a fluorescent, a semiconductor light emitting element such as a semiconductor laser, or a solid state light emitting element that is for example an organic electro luminescence (EL), an inorganic EL, or the like.

Power source 34 converts alternating power or direct power supplied from outside to direct power suitable for operations by luminaire 30 and supplies luminaire 30 with the direct power. Power source 34 is for example a power circuit including an AC/DC converter or a DC/DC converter, etc.

Operation Example 1

Figure 3:
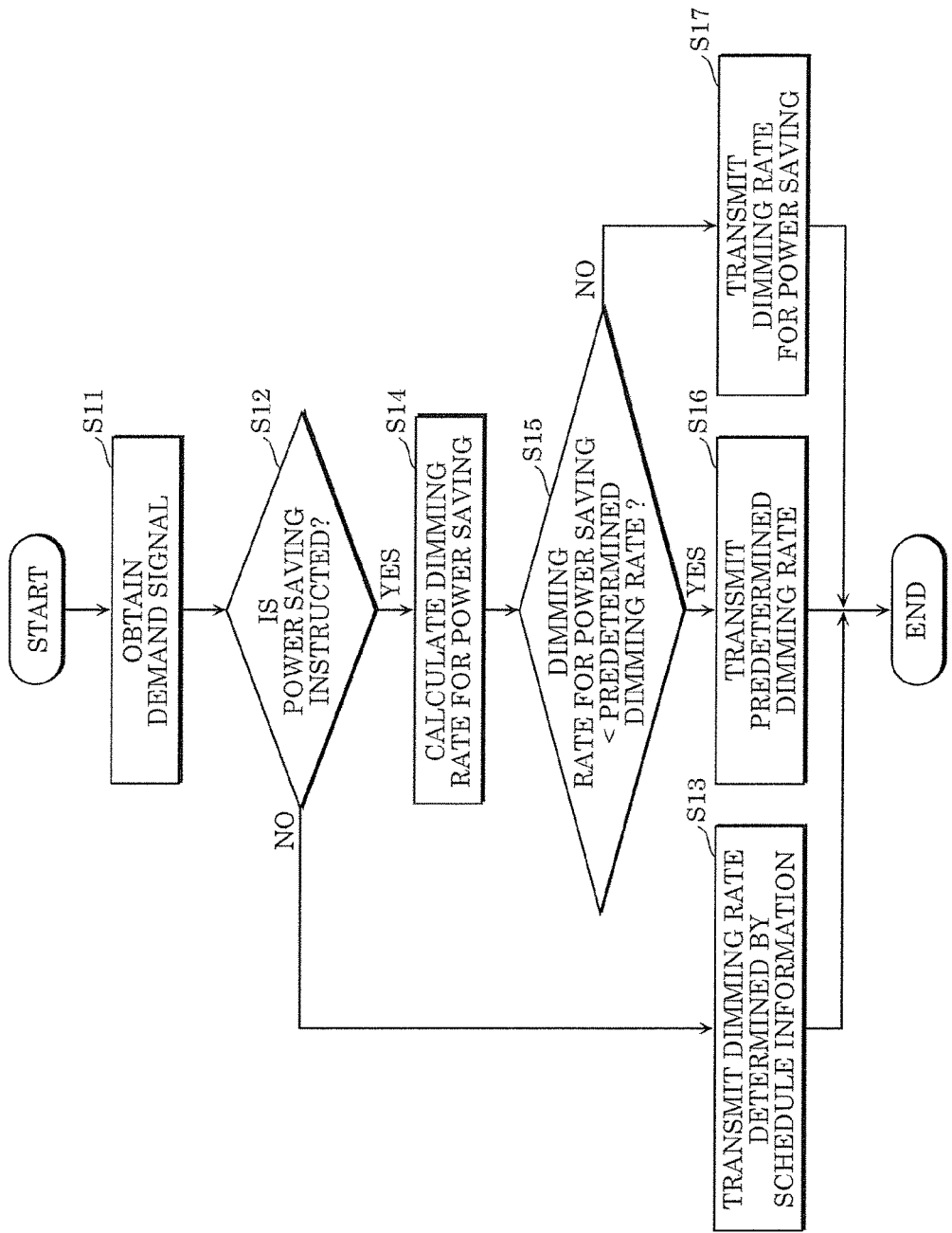
FIG. 3 is a flowchart indicating operation example 1 of the lighting control device.

Operation example 1 of lighting control device 20 in lighting system 10 is described. FIG. 3 is a flowchart of operation example 1 of lighting control device 20. It is assumed that schedule information is stored in storage 22 in advance in the description of operation example 1 below.

As illustrated in FIG. 3, obtainer 24 of lighting control device 20 obtains a demand signal (S11). Controller 25 firstly determines whether or not power saving is instructed via the demand signal (S12). In other words, controller 25 determines whether or not the demand signal is at the high level.

When the demand signal is at the low level, that is, when power saving is not instructed via the demand signal (No in S12), controller 25 transmits a dimming rate determined by the schedule information stored in storage 22 to transmitter 27 (S13).

Specifically, controller 25 reads out the schedule information from storage 22, and identifies, based on the read-out schedule information, the dimming rate which is notified by timer 26 as a dimming rate that should be transmitted at a current time. Subsequently, controller 25 causes transmitter 27 to transmit a control signal including the identified dimming rate. In this way, luminaire 30 emits light at the dimming rate according to the schedule information.

On the other hand, when the demand signal is at the high level, that is, when power saving is instructed via the demand signal (Yes in S12), controller 25 calculates a dimming rate (dimming rate for power saving) for causing luminaire 30 to emit light at a brightness below the dimming rate determined by the schedule information (S14).

Specifically, controller 25 reads out the schedule information from storage 22, and identifies, based on the read-out schedule information, the dimming rate which is notified by timer 26 as a dimming rate that should be transmitted at a current time. In addition, controller 25 reads out the reduction rate from storage 22, and calculates, as the dimming rate for power saving, a dimming rate obtained by integrating (100%−the reduction rate) to the identified dimming rate.

Next, controller 25 determines whether or not the calculated dimming rate for power saving is lower than a predetermined dimming rate (S15). In other words, controller 25 determines whether or not the calculated dimming rate for power saving is a dimming rate which causes luminaire 30 to emit light at a brightness lower than in the case of the predetermined dimming rate.

When determining that dimming rate for power saving is a control value which causes luminaire 30 to emit light at a brightness lower than in the case of the predetermined dimming rate (Yes in S15), controller 25 causes transmitter 27 to transmit the predetermined dimming rate (S16). In this way, luminaire 30 emits light at the predetermined dimming rate.

On the other hand, when determining that the dimming rate for power saving is a dimming rate which causes luminaire 30 to emit light at a brightness higher than in the case of the predetermined dimming rate (No in S15), controller 25 causes transmitter 27 to transmit a dimming rate for power saving (S17). In this way, luminaire 30 emits light at the dimming rate for power saving.

Figure 4:
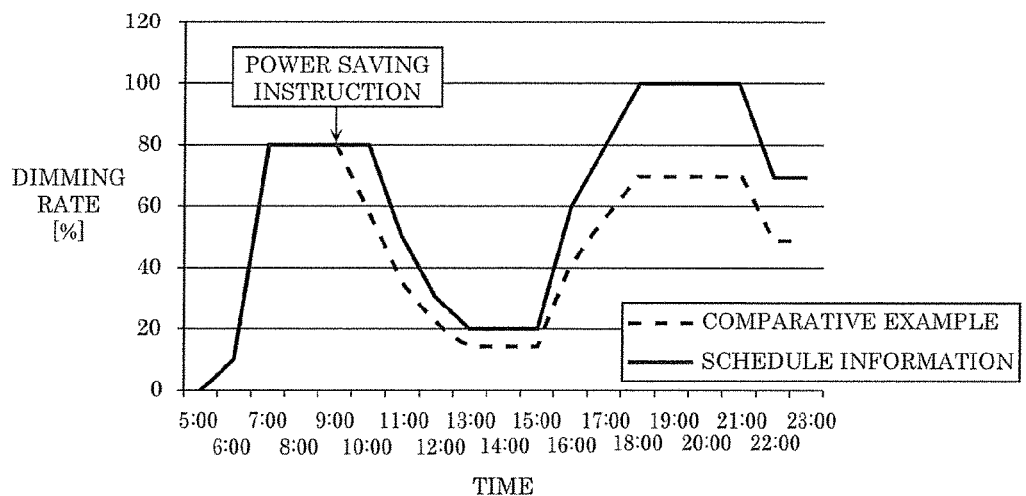
FIG. 4 is a diagram showing a variation in dimming rate in a comparative example.
Figure 5:
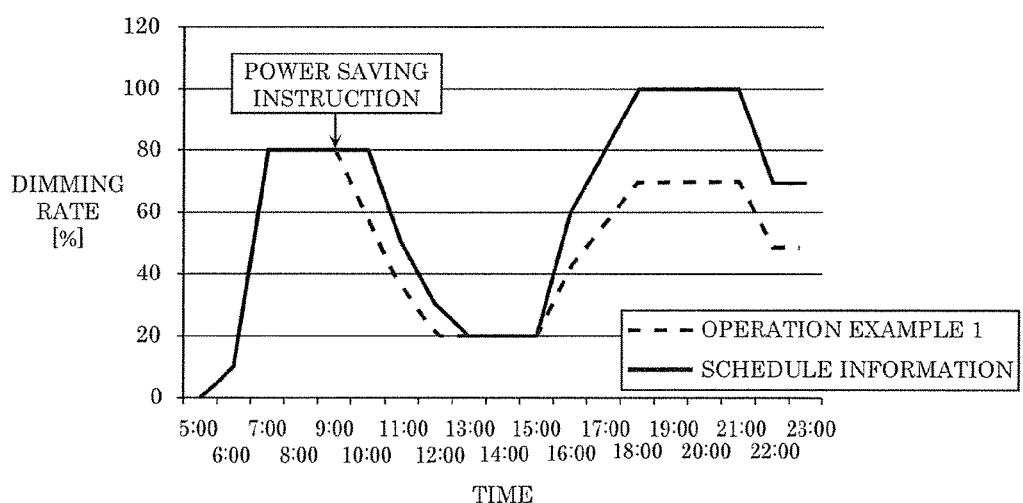
FIG. 5 is a diagram showing a variation in dimming rate in operation example 1.

A variation in dimming rate of luminaire 30 in the case where operation example 1 as described above has been performed is described with reference to a comparative example. FIG. 4 is a diagram indicating a variation in dimming rate in the comparative example. FIG. 5 is a diagram indicating a variation in dimming rate in operation example 1.

Each of FIGS. 4 and 5 illustrates the variation in dimming rate in the case where power saving is instructed via a demand signal when luminaire 30 (light control device 20) is operating based on the same schedule information.

In the comparative example illustrated in FIG. 4, after power saving is instructed via the demand signal, luminaire 30 emits light at the dimming rate for power saving. In this way, luminaire 30 emits light at the dimming rate lower than the predetermined dimming rate of 20% from 13 to 15 o'clock.

On the other hand, in operation example 1 illustrated in FIG. 5, after power saving is instructed via the demand signal, luminaire 30 basically emits light at the dimming rate for power saving, but emits light at the predetermined dimming rate instead of the dimming rate for power saving when the dimming rate for power saving is less than the predetermined dimming rate of 20%. In other words, in operation example 1, luminaire 30 emits light at the predetermined dimming rate of 20% from 13 to 15 o'clock.

It is to be noted that the dimming rate determined by the schedule information is also 20% from 13 to 15 o'clock, and thus the predetermined dimming rate coincides with the dimming rate determined by the schedule information. However, the predetermined dimming rate and the dimming rate determined by the schedule information do not need to coincide with each other.

As described above, when lighting control device 20 operates as in operation example 1, the minimum brightness of luminaire 30 is secured. In other words, when lighting control device 20 operates as in operation example 1, luminaire 30 is prevented from emitting light at too low brightness, and thus it is possible to reduce the amount of power to be used while securing safety.

Operation Example 2

Figure 6:
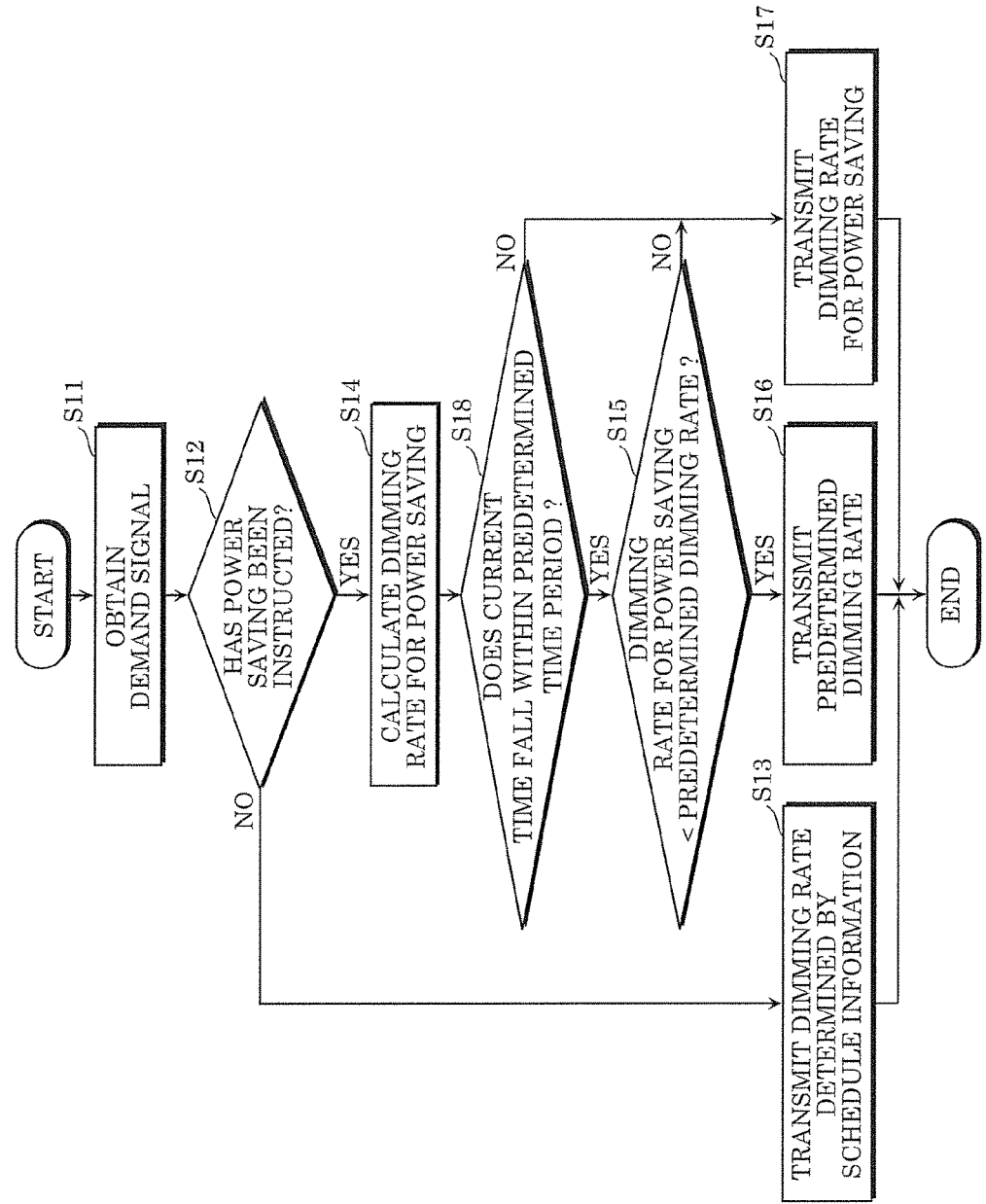
FIG. 6 is a flowchart indicating operation example 2 of the lighting control device.

Hereinafter, operation example 2 of lighting control device 20 in lighting system 10 is described. FIG. 6 is a flowchart of operation example 2 of lighting control device 20. It is to be noted that, in the descriptions of operation example 2 below, the same descriptions as provided regarding operation example 1 are simplified or omitted.

In the flowchart of operation example 2 illustrated in FIG. 6, Step S18 is added between Step S14 and Step S15 in the flowchart of operation example 1.

After the dimming rate for power saving is calculated in Step S14, controller 25 determines whether or not a current time falls within a predetermined time period (S18). Specifically, controller 25 reads out the predetermined time period stored in storage 22 in advance, and determines whether or not the current time notified by timer 26 falls within the read-out predetermined time period.

When determining that the current time does not fall within the predetermined time period (No in S18), controller 25 causes transmitter 27 to transmit the dimming rate for power saving (S17). In this way, luminaire 30 emits light at the dimming rate for power saving.

It is to be noted that, when determining that the current time does not fall within the predetermined time period (No in S18), controller 25 may cause transmitter 27 to transmit a dimming rate determined by schedule information (S13). In this case, Step S18 may be present between Step S12 and Step S14.

On the other hand, when determining that the current time falls within the predetermined time period (Yes in S18), controller 25 determines whether or not the calculated dimming rate for power saving is lower than the predetermined dimming rate (S15). The subsequent steps are the same as in operation example 1.

Figure 7:
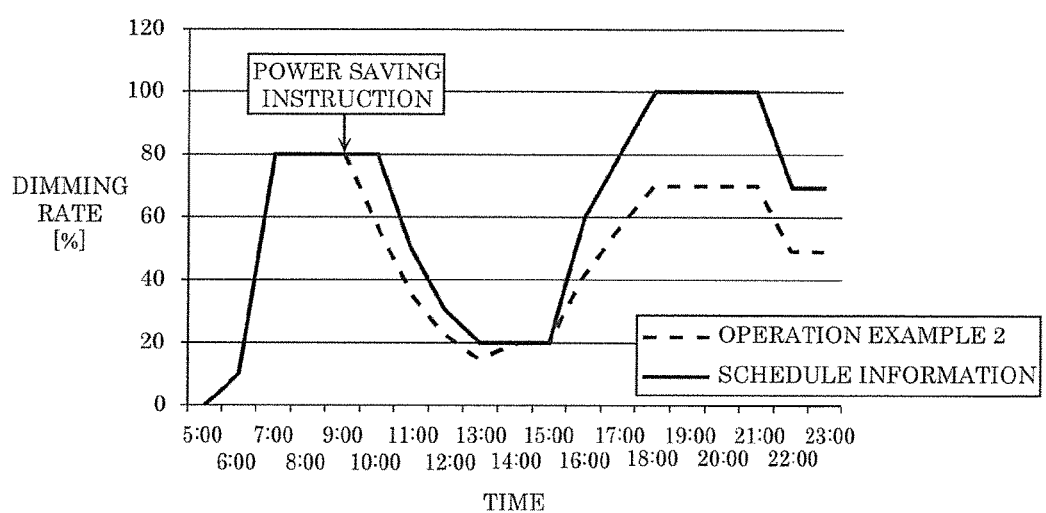
FIG. 7 is a diagram showing a variation in dimming rate in operation example 2.

A variation in dimming rate of luminaire 30 in the case where operation example 2 as described above is performed is described. FIG. 7 is a diagram indicating the variation in dimming rate in operation example 2.

FIG. 7 illustrates a variation in dimming rate in the case where power saving is instructed via a demand signal when luminaire 30 (lighting control device 20) is operating based on the same schedule information as in the above-described comparative example and operation example 1.

In the example of FIG. 7, the predetermined time period is for example from 14 to 24 o'clock (time to 23 o'clock is illustrated in FIG. 7). The dimming rate for power saving is a dimming rate lower than the predetermined dimming rate of 20% from 13 and 15 o'clock. Luminaire 30 emits light at the dimming rate for power saving lower than the predetermined dimming rate at a time point of 13 o'clock which does not fall within the predetermined time period, and emits light at the predetermined dimming rate of 20% from 14 to 15 o'clock.

As described above, when lighting control device 20 operates as in operation example 2, a user can specify a time period in which the minimum brightness (dimming rate) of luminaire 30 is determined, by inputting the predetermined time period in advance.

Operation Example 3

Figure 8:
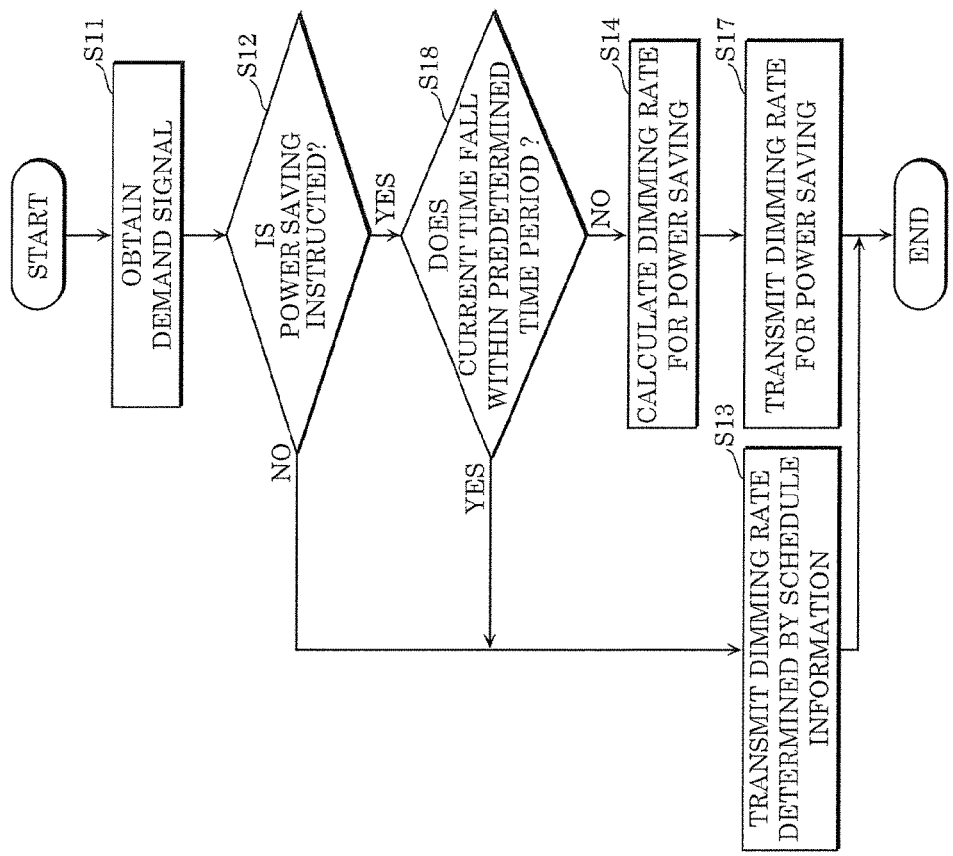
FIG. 8 is a flowchart indicating operation example 3 of the lighting control device.

Hereinafter, operation example 3 of lighting control device 20 in lighting system 10 is described. FIG. 8 is a flowchart of operation example 3 of lighting control device 20. It is to be noted that, in the descriptions of operation example 3 below, the same descriptions as provided regarding operation example 1 are simplified or omitted.

In operation example 3, a determination as to whether or not a current time falls within a predetermined time period is made as in operation example 2. Here, the predetermined time period in operation example 3 is different from that of operation example 2 and is defined as a time period in which an instruction for power saving by a demand signal is invalidated.

As illustrated in FIG. 8, obtainer 24 of lighting control device 20 obtains a demand signal (S11). Controller 25 firstly determines whether power saving is instructed via the obtained demand signal (S12).

When power saving is not instructed via the demand signal (No in S12), controller 25 causes transmitter 27 to transmit the dimming rate determined by the schedule information stored in storage 22 (S13). In this way, luminaire 30 emits light at the dimming rate determined by the schedule information.

On the other hand, when power saving is instructed via the demand signal (Yes in S12), controller 25 determines whether or not the current time falls within the predetermined time period (S18). When determining that the current time falls within the predetermined time period (Yes in S18), controller 25 causes transmitter 27 to transmit the dimming rate determined by the schedule information (S17). In this way, luminaire 30 emits light at the dimming rate determined by the schedule information.

On the other hand, when determining that the current time does not fall within the predetermined time period (No in S18), controller 25 calculates a dimming rate (a dimming rate for power saving) which causes luminaire 30 to emit light at a brightness lower than in the case of the dimming rate determined by the schedule information (S14). Subsequently, controller 25 causes transmitter 27 to transmit a dimming rate for power saving (S17). In this way, luminaire 30 emits light at the dimming rate for power saving.

Figure 9:
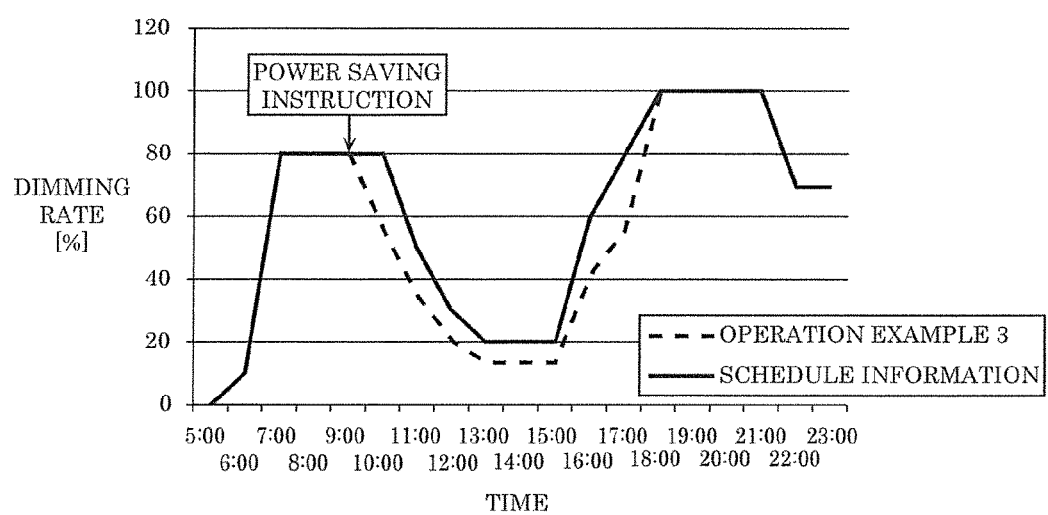
FIG. 9 is a diagram showing a variation in dimming rate in operation example 3.

A variation in dimming rate of luminaire 30 in the case where the above operation example 3 is performed is described. FIG. 9 is a diagram indicating the variation in dimming rate in operation example 3.

FIG. 9 illustrates a variation in dimming rate in the case where power saving is instructed via a demand signal when luminaire 30 (lighting control device 20) is operating based on the same schedule information as in the comparative example, operation example 1, and operation example 2 described above.

In the example of FIG. 9, the predetermined time period is for example from 18 to 24 o'clock (time to 23 o'clock is illustrated in FIG. 9). In operation example 3 to be described later, the predetermined time period is a time period in which the power saving instruction by the demand signal is invalidated. Accordingly, luminaire 30 emits light at the dimming rate determined by the schedule information at and after 18 o'clock although power saving has been instructed.

In operation example 3, when the predetermined time period is determined as a predetermined time period in which the surrounding environment becomes dark, the brightness of luminaire 30 is secured in the time period in which the surrounding environment becomes dark. On the other hand, in a time period which is other than the predetermined time period and in which the surrounding environment is comparatively bright, the amount of power to be used is reduced by a power saving instruction of a demand signal. In other words, when lighting control device 20 operates as in operation example 3, it is possible to reduce the amount of power to be used while securing safety.

[Variation]

It is only necessary for obtainer 24 to obtain at least one demand signal, obtainer 24 may obtain two demand signals which are a first demand signal and a second demand signal from different signal lines. In this case, power saving instructions in two or more stages may be made by the two demand signals.

For example, when there is a possibility that the amount of power to be used exceeds a target use amount, power saving is firstly instructed via only the first demand signal changing to the high level. The instruction for power saving is also referred to as a first-stage instruction.

When the possibility that the amount of power to be used exceeds the target use amount further increases, higher power saving is instructed by means of also the second demand signal changing to the high level in addition to the first demand signal. The instruction for power saving is also referred to as a second-stage instruction. The second-stage instruction is performed when the necessity for power saving is higher than in the case of the first-stage instruction.

It is to be noted that when the possibility that the amount of power to be used exceeds the target use amount is low and any power saving instruction is made, both of the first demand signal and the second demand signal are at the low level.

In this way, the first demand signal and the second demand signal (power saving instruction signals) may instruct power saving in two stages. The user can input (specify) a reduction rate for each of the stages. For example, the user can specify 15% as a reduction rate in the case where a first-stage instruction has been made, and 30% as a reduction rate in the case where a second-stage instruction has been made.

Figure 10:
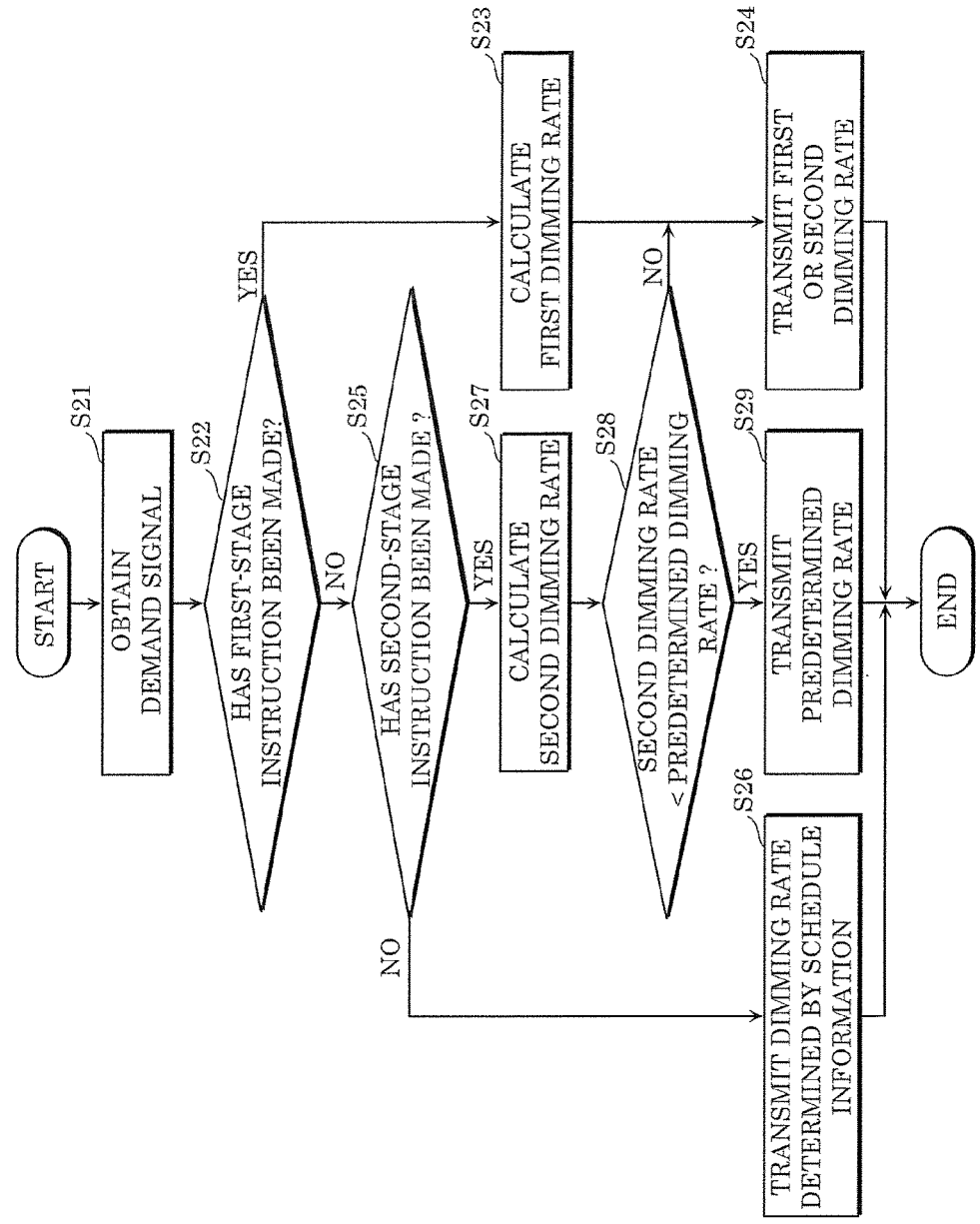
FIG. 10 is a flowchart indicating a variation of operation example 1 of the lighting control device.

When power saving instructions are made in two stages, for example, operation example 1 illustrated in FIG. 3 may be modified as in FIG. 10. FIG. 10 is a flowchart of an operation performed by lighting control device 20 according to a variation of the embodiment. It is to be noted that, in the descriptions of this variation below, the same descriptions as provided regarding operation example 1 are simplified or omitted.

As illustrated in FIG. 10, obtainer 24 of lighting control device 20 firstly obtains a demand signal (S21). Controller 25 firstly determines whether or not a first-stage instruction has been made by the obtained demand signal (S22). In other words, controller 25 determines whether or not only a first demand signal is at the high level.

When determining that the first-stage instruction has been made (Yes in S22), controller 25 calculates a first dimming rate (a dimming rate for the first stage) for causing luminaire 30 to emit light at a brightness lower than in the case of a dimming rate determined by schedule information (S23). Specifically, controller 25 calculates the first dimming rate assuming that a reduction rate is 15%. The first dimming rate is an example of a first control value. Subsequently, controller 25 causes transmitter 27 to transmit the first dimming rate (S24). In this way, luminaire 30 emits light at the first dimming rate.

On the other hand, when determining that no first-stage instruction has been made (No in S22), controller 25 determines whether or not a second-stage instruction has been made via the obtained demand signal (S25). In other words, controller 25 determines whether or not both of the first demand signal and the second demand signal are at the high level. It is to be noted that the process in Step S22 and the process in Step S25 may be performed in an inverse order.

When determining that no second-stage instruction has been made (No in S25), controller 25 determines that no power saving instruction has been made via the obtained demand signal, and causes transmitter 27 to transmit the dimming rate determined by the schedule information stored in storage 22 (S26).

When determining that the second-stage instruction has been made (Yes in S25), controller 25 calculates a second dimming rate (a dimming rate for the second stage) for causing luminaire 30 to emit light at a brightness lower than in the case of the first dimming rate (S27). Specifically, controller 25 calculates the second dimming rate assuming that a reduction rate is 30%. The second dimming rate is an example of a second control value.

Next, controller 25 determines whether or not the calculated second dimming rate is lower than a predetermined dimming rate (S28). In other words, controller 25 determines whether or not the calculated second dimming rate is a dimming rate which causes luminaire 30 to emit light at a brightness lower than in the case of the predetermined dimming rate.

When determining that the second dimming rate is a control value which causes luminaire 30 to emit light at the brightness lower than in the case of the predetermined dimming rate (Yes in S28), controller 25 causes transmitter 27 to transmit the predetermined dimming rate (S29). In this way, luminaire 30 emits light at the predetermined dimming rate.

On the other hand, when determining that the second dimming rate is a dimming rate which causes luminaire 30 to emit light at a brightness higher than in the case of the predetermined dimming rate (No in S28), controller 25 causes transmitter 27 to transmit the second dimming rate (S24). In this way, luminaire 30 emits light at the second dimming rate.

In the case where lighting control device 20 operates as in this variation, it is possible to reduce the amount of power to be used as usual when a first-stage instruction is made, and ensure that luminaire 30 keeps the minimum brightness when a second-stage instruction is made. It is to be noted that operation example 2 may be modified in the same manner.

In addition, in the above description of this variation, two demand signals are used so as to make power saving instructions in two stages. However, power saving instructions may be made in two stages by a demand signal taking three values. In addition, the logic of each demand signal described in this variation is a mere example. The logic of each demand signal may be determined arbitrarily.

Effects

As described above, lighting control device 20 controls luminaire 30 that emits light at a brightness that varies in accordance with a dimming rate which has been received. Lighting control device 20 includes: storage 22 which stores schedule information in which a dimming rate and one of a time point or a time period are associated with each other; transmitter 27 which transmits a dimming rate to luminaire 30; obtainer 24 which obtains a power saving instruction signal for instructing lighting control device 20 to save power or not; and controller 25. Controller 25 causes transmitter 27 to transmit the dimming rate which is determined by schedule information stored in storage 22 when power saving is not instructed via a power saving instruction signal. Controller 25 calculates a dimming rate for causing luminaire 30 to emit light at a brightness lower than in the case of the dimming rate determined by the schedule information when power saving is instructed via the power saving instruction signal. When the calculated dimming rate is a dimming rate which causes luminaire 30 to emit light at a brightness lower than a predetermined dimming rate, controller 25 causes transmitter 27 to transmit the predetermined dimming rate. The dimming rate is an example of a control value.

In this way, luminaire 30 emits light at least at a brightness corresponding to the predetermined dimming rate even when power saving has been instructed, and thus it is ensured that luminaire 30 emits light at least at the minimum brightness. In other words, lighting control device 20 makes it possible to prevent luminaire 30 from emitting light at a too low brightness even when the power saving has been instructed, and thus to reduce the amount of power to be used while securing safety.

In addition, when power saving is instructed via the power saving instruction signal, in the case where the calculated dimming rate is a dimming rate which causes luminaire 30 to emit light at a brightness higher than in the case of the predetermined dimming rate, controller 25 may cause transmitter 27 to transmit the calculated dimming rate.

In this way, when power saving has been instructed, lighting control device 20 is capable of causing luminaire 30 to emit light at a brightness higher than in the case of the predetermined dimming rate, and reduce the amount of power to be used.

In addition, controller 25 may determine whether or not a current time falls within a predetermined time period. when power saving is instructed via the power saving instruction signal, and when determining that the current time falls within the predetermined time period, in the case where the calculated dimming rate is a dimming rate which causes luminaire 30 to emit light at a brightness lower than in the case of the predetermined dimming rate, may cause transmitter 27 to transmit the predetermined dimming rate.

In this way, when the predetermined time period is specified by the user, lighting control device 20 can change the time period in which the minimum brightness (dimming rate) of luminaire 30 is determined, according to the specification by the user.

In addition, controller 25 may cause transmitter 27 to transmit the calculated dimming rate (i) in the case where the calculated dimming rate is a dimming rate which causes luminaire 30 to emit light at a brightness higher than in the case of the predetermined dimming rate when determining that the current time falls within the predetermined time period, and (ii) when determining that the current time does not fall within the predetermined time period.

In this way, lighting control device 20 can cause luminaire 30 to emit light according to the calculated dimming rate.

In addition, the power saving instruction signal may instruct power saving in two stages using a first-stage instruction and a second-stage instruction which is made when power needs to be saved more than in the case of the first-stage instruction. When the first-stage instruction is made by the power saving instruction signal, controller 25 may calculate a first dimming rate for causing luminaire 30 to emit light at a brightness lower than in the case of the dimming rate determined by the schedule information, and may cause transmitter 27 to transmit the calculated first dimming rate. When the second-stage instruction is made via the power saving instruction signal, controller 25 may calculate a second dimming rate for causing luminaire 30 to emit light at a brightness lower than in the case of the first dimming rate. When the calculated second dimming rate is a dimming rate which causes luminaire 30 to emit light at a brightness lower than in the case of the predetermined dimming rate, controller 25 may cause transmitter 27 to transmit the predetermined dimming rate.

In this way, lighting control device 20 can cause luminaire 30 to emit light at the calculated first dimming rate when the first-stage instruction has been made, and thereby reduce the amount of power to be used. In addition, luminaire 30 emits light at least at the brightness corresponding to the predetermined dimming rate even when the second-stage instruction has been made, and thus it is ensured that luminaire 30 emits light at least at the minimum brightness. In other words, lighting control device 20 makes it possible to prevent luminaire 30 from emitting light at a too low brightness even when the second-stage instruction has been made, and thus to reduce the amount of power to be used while securing safety.

In addition, lighting control device 20 controls luminaire 30 that emits light at a brightness that varies in accordance with a dimming rate which has been received. Lighting control device 20 includes: storage 22 which stores schedule information in which a dimming rate and one of a time point or a time period are associated with each other; transmitter 27 which transmits a dimming rate to luminaire 30; obtainer 24 which obtains a power saving instruction signal for instructing lighting control device 20 to save power or not; and controller 25. Controller 25 determines whether or not a current time falls within a predetermined time period when power saving is instructed via the power saving instruction signal. When determining that the current time falls within the predetermined time zone, controller 25 causes transmitter 27 to transmit the dimming rate determined by the schedule information stored in storage 22. When determining that the current time does not fall within the predetermined time period, controller 25 calculates a dimming rate for causing luminaire 30 to emit light at a brightness lower than in the case of the dimming rate determined by the schedule information, and causes transmitter 27 to transmit the calculated dimming rate.

In this way, lighting control device 20 can cause luminaire 30 to emit light according to the schedule information prioritizing securing of the brightness over reducing the amount of power to be used in the predetermined time period. In other words, lighting control device 20 is capable of reducing the amount of power to be used while securing safety.

In addition, when power saving is not instructed via the power saving instruction signal, controller 25 may cause transmitter 27 to transmit the control value determined by the schedule information stored in storage 22.

In this way, lighting control device 20 can cause luminaire 30 to transmit the control value determined by the schedule information when no power saving is instructed.

In addition, lighting system 10 includes: luminaire 30 that emits light at a brightness that varies in accordance with a dimming rate which has been received; and lighting control device 20 which controls luminaire 30. Lighting control device 20 includes: storage 22 which stores schedule information in which a dimming rate and one of a time point or a time period are associated with each other; transmitter 27 which transmits a dimming rate to luminaire 30; obtainer 24 which obtains a power saving instruction signal for instructing lighting control device 20 to save power or not; and controller 25. Controller 25 causes transmitter 27 to transmit the dimming rate which is determined by schedule information stored in storage 22 when power saving is not instructed via a power saving instruction signal. Controller 25 calculates a dimming rate for causing luminaire 30 to emit light at a brightness lower than in the case of the dimming rate determined by the schedule information when power saving is instructed via the power saving instruction signal. When the calculated dimming rate is a dimming rate which causes luminaire 30 to emit light at a brightness lower than a predetermined dimming rate, controller 25 causes transmitter 27 to transmit the predetermined dimming rate.

In this way, luminaire 30 emits light at least at the brightness corresponding to the predetermined dimming rate even when power saving has been instructed, and thus it is ensured that luminaire 30 emits light at least at the minimum brightness. In other words, lighting system 10 makes it possible to prevent luminaire 30 from emitting light at a too low brightness even when the power saving has been instructed, and thus to reduce the amount of power to be used while securing safety.

In addition, lighting system 10 includes: luminaire 30 that emits light at a brightness that varies in accordance with a dimming rate which has been received; and lighting control device 20 which includes luminaire 30. Lighting control device 20 includes: storage 22 which stores schedule information in which a dimming rate and one of a time point or a time period are associated with each other; transmitter 27 which transmits a dimming rate to luminaire 30; obtainer 24 which obtains a power saving instruction signal for instructing lighting control device 20 to save power or not; and controller 25. Controller 25 determines whether or not a current time falls within a predetermined time period when power saving is instructed via the power saving instruction signal. When determining that the current time falls within the predetermined time zone, controller 25 causes transmitter 27 to transmit the dimming rate determined by the schedule information stored in storage 22. When determining that the current time does not fall within the predetermined time period, controller 25 calculates a dimming rate for causing luminaire 30 to emit light at a brightness lower than in the case of the dimming rate determined by the schedule information, and causes transmitter 27 to transmit the calculated dimming rate.

In this way, lighting system 10 can cause luminaire 30 to emit light according to the schedule information prioritizing securing of the brightness over reducing the amount of power to be used in the predetermined time period. In other words, lighting system 10 is capable of reducing the amount of power to be used while securing safety.

In addition, a control method for controlling luminaire 30 which emits light at a brightness that varies in accordance with a dimming rate which has been received includes: obtaining a power saving instruction signal; and, when power saving is not instructed via the power saving instruction signal, transmitting, to luminaire 30, a dimming rate which is determined by schedule information in which the dimming rate and one of a time point or a time period are associated with each other. The control method further includes: when power saving is instructed via the power saving instruction signal, calculating a dimming rate for causing luminaire 30 to emit light at a brightness lower than in the case of the dimming rate determined by the schedule information, and, when the calculated dimming rate is a dimming rate which causes luminaire 30 to emit light at a brightness lower than in the case of a predetermined dimming rate, transmitting the predetermined dimming rate to luminaire 30.

In this way, luminaire 30 emits light at least at the brightness corresponding to the predetermined dimming rate even when power saving has been instructed, and thus it is ensured that luminaire 30 emits light at least at the minimum brightness. In other words, the control method makes it possible to prevent luminaire 30 from emitting light at a too low brightness even when the power saving has been instructed, and thus to reduce the amount of power to be used while securing safety.

In addition, a control method for controlling luminaire 30 that emits light at a brightness that varies in accordance with a dimming rate which has been received includes: obtaining a power saving instruction signal; and, when power saving is instructed via the power saving instruction signal, determining whether or not a current time falls within a predetermined time period. The control method further includes: when determining that the current time falls within the predetermined time period, transmitting, to luminaire 30, a dimming rate which is determined by schedule information in which the dimming rate and one of a time point or a time period are associated with each other. The control method further includes: when determining that the current time does not fall within the predetermined time period, calculating a dimming rate for causing luminaire 30 to emit light at a brightness lower than in the case of the dimming rate determined by the schedule information, and transmitting the calculated dimming rate to luminaire 30.

In this way, the control method makes it possible to cause luminaire 30 to emit light according to the schedule information prioritizing securing of the brightness over reducing the amount of power to be used in the predetermined time period. In other words, the control method makes it possible to reduce the amount of power to be used while securing safety.

Other Embodiments

Although the lighting system according to the embodiment has been described above, the present disclosure is not limited to the above-described embodiment.

For example, although the lighting control device is implemented as a device separate from the luminaire in the above embodiment, the lighting control device may be embedded in the luminaire. In short, the lighting control device may be implemented as part of the luminaire. In this case, a schedule etc. is input by a user, for example, indirectly via a remote controller or a smartphone.

The method for communication between the lighting control device and the luminaire described in the above embodiment is a mere example. The method for communication between the lighting control device and the luminaire is not particularly limited. For example, the lighting control device and the luminaire perform wireless communication using a communication protocol that is specified low power radio, ZigBee (registered trademark), Bluetooth (registered trademark), or Wi-Fi (registered trademark).

Instead of the wireless communication, the lighting control device and the luminaire perform wired communication using power line communication (PLC) or a wired LAN.

In addition, each of the constituent elements in the above embodiment may be configured as exclusive hardware or implemented by means of executing a software program suitable for the constituent element. Each of the constituent elements may be implemented by means of a program executer such as a CPU or a processor reading and executing a software program recorded on a recording medium such as a hard disc or a semiconductor memory.

In addition, each of the constituent elements may be a circuit (or an integrated circuit). These circuits may be configured as a single circuit as a whole, or may be configured as separate circuits. In addition, each of the circuits may be a general-purpose circuit or an exclusive circuit.

In addition, the general or specific aspect of the preset disclosure may be implemented as a system, a device, a method, an integrated circuit, a computer program, or a recording medium such as a computer-readable CD-ROM. Alternatively, the general or specific aspect of the present disclosure may be implemented as an arbitrary combination of the system, the device, the method, the integrated circuit, the computer program, or the recording medium.

For example, the present disclosure may be implemented as the lighting system, the lighting control device, and the luminaire according to the above embodiment. In addition, the present disclosure may be implemented as a program for use in one of the lighting control device or the luminaire. In addition, the present disclosure may be implemented as the method for controlling the luminaire according to the above embodiment.

In addition, the order of the plurality of processes in each operation by the lighting system described in the above embodiment is a mere example. The order of the plurality of processes may be changed, or the processes may be executed in parallel.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting control device which controls a luminaire that emits light at a brightness that varies in accordance with a control value which has been received, the lighting control device comprising:
   a storage which stores schedule information in which a control value and one of a time point or a time period are associated with each other;
   a transmitter which transmits a control value to the luminaire;
   an obtainer which obtains a power saving instruction signal for instructing the lighting control device to save power or not; and
   a controller,
   wherein the controller:
   when power saving is not instructed via the power saving instruction signal, causes the transmitter to transmit the control value which is determined by the schedule information stored in the storage; and
   when power saving is instructed via the power saving instruction signal, calculates a control value for causing the luminaire to emit light at a brightness lower than in the case of the control value determined by the schedule information, and, when the control value calculated is a control value which causes the luminaire to emit light at a brightness lower than in the case of a predetermined control value, causes the transmitter to transmit the predetermined control value.

2. The lighting control device according to claim 1, wherein, when power saving is instructed via the power saving instruction signal, in the case where the control value calculated is a control value which causes the luminaire to emit light at a brightness higher than in the case of the predetermined control value, the controller causes the transmitter to transmit the control value calculated.

3. The lighting control device according to claim 1, wherein the controller:
   determines whether or not a current time falls within a predetermined time period; and
   when power saving is instructed via the power saving instruction signal, and when determining that the current time falls within the predetermined time period in the case where the control value calculated is a control value which causes the luminaire to emit light at a brightness lower than in the case of the predetermined control value, causes the transmitter to transmit the predetermined control value.

4. The lighting control device according to claim 3, wherein the controller causes the transmitter to transmit the control value calculated (i) in the case where the control value calculated is a control value which causes the luminaire to emit light at a brightness higher than in the case of the predetermined control value when determining that the current time falls within the predetermined time period, and (ii) when determining that the current time does not fall within the predetermined time period.

5. The lighting control device according to claim 1, wherein the power saving instruction signal instructs power saving in two stages using a first-stage instruction and a second-stage instruction which is made when power needs to be saved more than in the case of the first-stage instruction,
   the controller:
   when the first-stage instruction is made by the power saving instruction signal, calculates a first control value for causing the luminaire to emit light at a brightness lower than in the case of the control value determined by the schedule information, and causes the transmitter to transmit the first control value calculated; and
   when the second-stage instruction is made via the power saving instruction signal, calculates a second control value for causing the luminaire to emit light at a brightness lower than in the case of the first control value, and, when the second control value calculated is a control value which causes the luminaire to emit light at a brightness lower than in the case of the predetermined control value, causes the transmitter to transmit the predetermined control value.

6. A lighting control device which controls a luminaire that emits light at a brightness that varies in accordance with a control value which has been received, the lighting control device comprising:
   a storage which stores schedule information in which a control value and one of a time point or a time period are associated with each other;
   a transmitter which transmits a control value to the luminaire;

an obtainer which obtains a power saving instruction signal for instructing the lighting control device to save power or not; and a controller, wherein the controller:

when power saving is instructed via the power saving instruction signal, determines whether or not a current time falls within a predetermined time period;

when determining that the current time falls within the predetermined time period, causes the transmitter to transmit the control value which is determined by the schedule information stored in the storage; and when determining that the current time does not fall within the predetermined time period, calculates a control value for causing the luminaire to emit light at a brightness lower than in the case of the control value determined by the schedule information, and causes the transmitter to transmit the control value calculated.

7. The control device according to claim 6, wherein, when power saving is not instructed via the power saving instruction signal, the controller causes the transmitter to transmit the control value determined by the schedule information stored in the storage.

8. A lighting system, comprising:

a luminaire that emits light at a brightness that varies in accordance with a control value which has been received; and a lighting control device which controls the luminaire;

wherein the lighting control device includes:

a storage which stores schedule information in which a control value and one of a time point or a time period are associated with each other;

a transmitter which transmits a control value to the luminaire;

an obtainer which obtains a power saving instruction signal for instructing the lighting control device to save power or not; and a controller, wherein the controller:

when power saving is not instructed via the power saving instruction signal, causes the transmitter to transmit the control value which is determined by the schedule information stored in the storage; and when power saving is instructed via the power saving instruction signal, calculates a control value for causing the luminaire to emit light at a brightness lower than in the case of the control value determined by the schedule information, and, when the control value calculated is a control value which causes the luminaire to emit light at a brightness lower than in the case of a predetermined control value, causes the transmitter to transmit the predetermined control value.

9. A lighting system, comprising:

a luminaire that emits light at a brightness that varies in accordance with a control value which has been received; and a lighting control device which controls the luminaire;

wherein the lighting control device includes:

a storage which stores schedule information in which a control value and one of a time point or a time period are associated with each other;

a transmitter which transmits a control value to the luminaire;

an obtainer which obtains a power saving instruction signal for instructing the lighting control device to save power or not; and a controller, wherein the controller:

when power saving is instructed via the power saving instruction signal, determines whether or not a current time falls within a predetermined time period;

when determining that the current time falls within the predetermined time period, causes the transmitter to transmit the control value which is determined by the schedule information stored in the storage; and when determining that the current time does not fall within the predetermined time period, calculates a control value for causing the luminaire to emit light at a brightness lower than in the case of the control value determined by the schedule information, and causes the transmitter to transmit the control value calculated.

10. A control method for controlling a luminaire which emits light at a brightness that varies in accordance with a control value which has been received, the control method comprising:

obtaining a power saving instruction signal;

when power saving is not instructed via the power saving instruction signal, transmitting, to the luminaire, a control value which is determined by schedule information in which the control value and one of a time point or a time period are associated with each other; and when power saving is instructed via the power saving instruction signal, calculating a control value for causing the luminaire to emit light at a brightness lower than in the case of the control value determined by the schedule information, and, when the control value calculated is a control value which causes the luminaire to emit light at a brightness lower than in the case of a predetermined control value, transmitting the predetermined control value to the luminaire.

11. A control method for controlling a luminaire that emits light at a brightness that varies in accordance with a control value which has been received, the lighting control device comprising:

obtaining a power saving instruction signal;

when power saving is instructed via the power saving instruction signal, determining whether or not a current time falls within a predetermined time period;

when determining that the current time falls within the predetermined time period, transmitting, to the luminaire, a control value which is determined by schedule information in which the control value and one of a time point or a time period are associated with each other; and when determining that the current time does not fall within the predetermined time period, calculating a control value for causing the luminaire to emit light at a brightness lower than in the case of the control value determined by the schedule information, and transmitting the control value calculated to the luminaire.

* * * * *